United States Patent

[11] 3,634,746

| [72] | Inventor | Robert J. Strege, Sr. |
| --- | --- | --- |
|  |  | Phoenix, Ariz. |
| [21] | Appl. No. | 83,566 |
| [22] | Filed | Oct. 23, 1970 |
| [45] | Patented | Jan. 11, 1972 |
| [73] | Assignee | Sperry Rand Corporation |

[54] MONITOR FOR SERVOSYSTEMS
5 Claims, 3 Drawing Figs.

[52] U.S. Cl.......................................................... 318/565, 244/77
[51] Int. Cl................................................................. G05b 23/02
[50] Field of Search............................................ 318/561, 565, 564; 244/77

[56] References Cited
UNITED STATES PATENTS

| 2,649,563 | 8/1953 | Meredith.................... | 318/565 |
| --- | --- | --- | --- |
| 2,768,343 | 10/1956 | Kutzler....................... | 318/565 |
| 3,493,836 | 2/1970 | Nelson....................... | 318/565 |
| 3,504,248 | 3/1970 | Miller......................... | 318/561 |

*Primary Examiner*—Benjamin Dobeck
*Attorney*—S. C. Yeaton

ABSTRACT: Apparatus for monitoring the operation of servosystems. The apparatus includes a dynamic monitor for providing a failure signal in accordance with the comparison between the rate of change of the servo displacement feedback signal and the servo rate feedback signal. The apparatus also includes a polarity monitor for providing a failure indication whenever the servo rate feedback signal is not of the proper polarity so that the servo displacement error signal is reduced.

MONITOR FOR SERVOSYSTEMS

BACKGROUND OF THE INVENTION

1. Field of the Invention

The invention pertains to servosystem monitors particularly of the type suitable for use with aircraft servosystems.

2. Description of the Prior Art

Aircraft servo monitors are known that utilize analog models that simulate the operation of the servo being monitored and provide signals in response to the servo input signals for comparison with the actual servo responses. Such monitors have the disadvantage that for moderately sophisticated servosystems, the servo model becomes unduly complex. In addition, the servo models are often not accurately representative of the servo monitored particularly for complex systems. Servo characteristics such as nonlinearities and saturation, as well as second order effects, are often not representable by analog models of reasonable complexity.

Prior art servo monitors of the analog model type have been found subject to nuisance tripping due to transient input signals of the type commonly encountered in normal aircraft operation.

The analog models utilized for monitoring dual channel servosystems having differential coupling driving the output member, a servo type used in modern jet transports, are unduly complicated particularly with regard to the model of the differential coupling.

SUMMARY OF THE INVENTION

The above prior art disadvantages are obviated by apparatus in accordance with the present invention wherein a polarity monitor provides a first monitor signal in accordance with a comparison of the polarities of the servo displacement error signal and the servo rate feedback signal.

A dynamic monitor is included for comparing the magnitudes of the servo rate feedback signal and the rate of change of the servo displacement feedback signal thereby providing a second monitor signal.

The first and second monitor signals represent the occurrence of malfunctions of the servo and provide a monitor output signals in accordance therewith.

DETAILED DESCRIPTION OF THE PREFERRED EMBODIMENT

Figure 2:
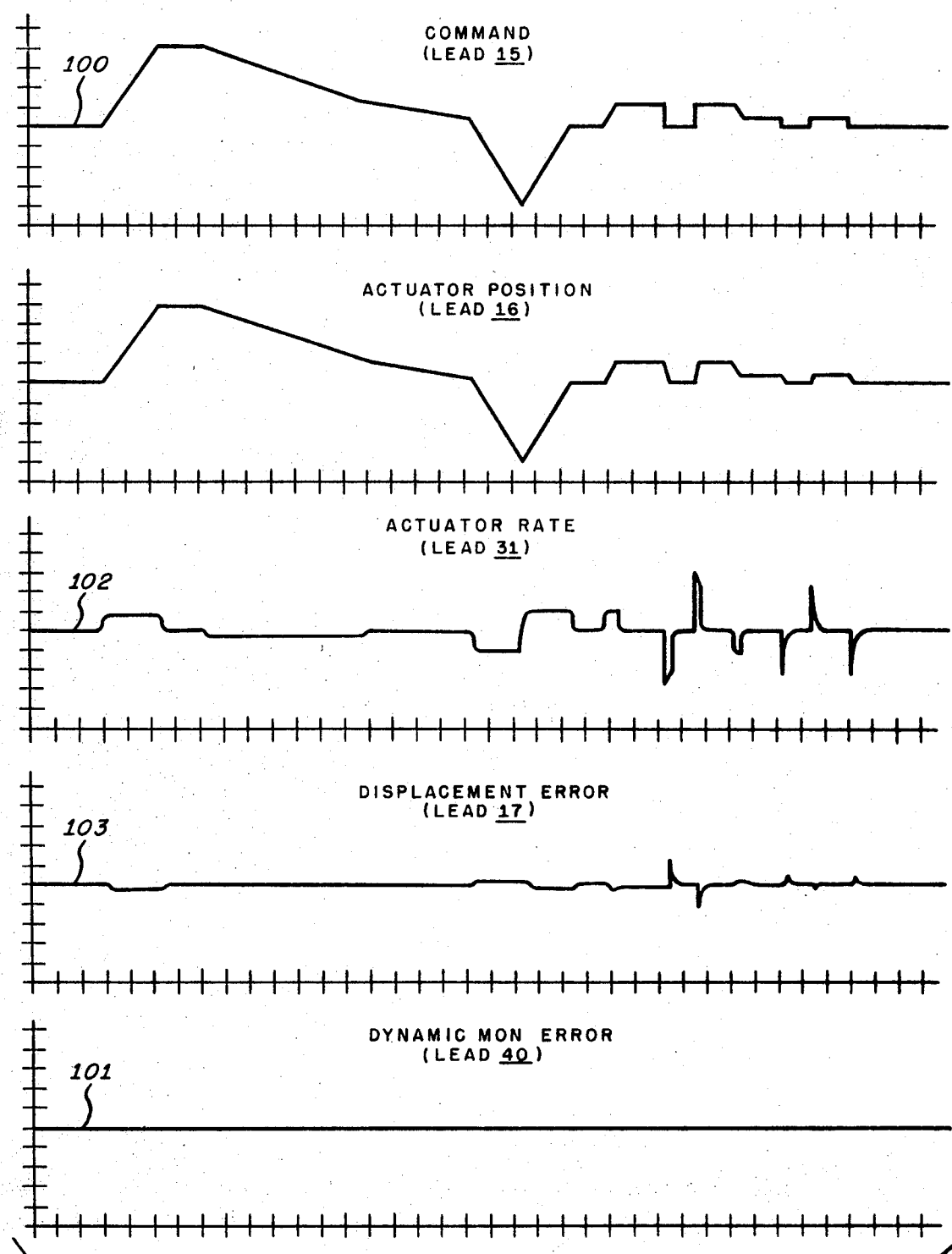
FIG. 2 is a waveform diagram useful in understanding the operation of the monitor of the present invention when monitoring a normally functioning servo.

The principles of the present invention as hereinafter described are applicable to the monitoring of a wide variety of servosystems. The monitor will be described, for purposes of explanation, in terms of a dual-channel servosystem for positioning the elevator control surface of an aircraft. Such a servosystem is illustrated in FIG. 2 of U.S. Pat. No. 3,504,248 entitled, Dual Channel Servo System Having Torque Equalization, by H. Miller, Issued Mar. 31, 1970, and assigned to the assignee of the present invention. The monitor will be explained in terms of servo channel 2 of FIG. 2 of the dual servosystem illustrated in said U.S. Pat. No. 3,504,248.

Figure 1:
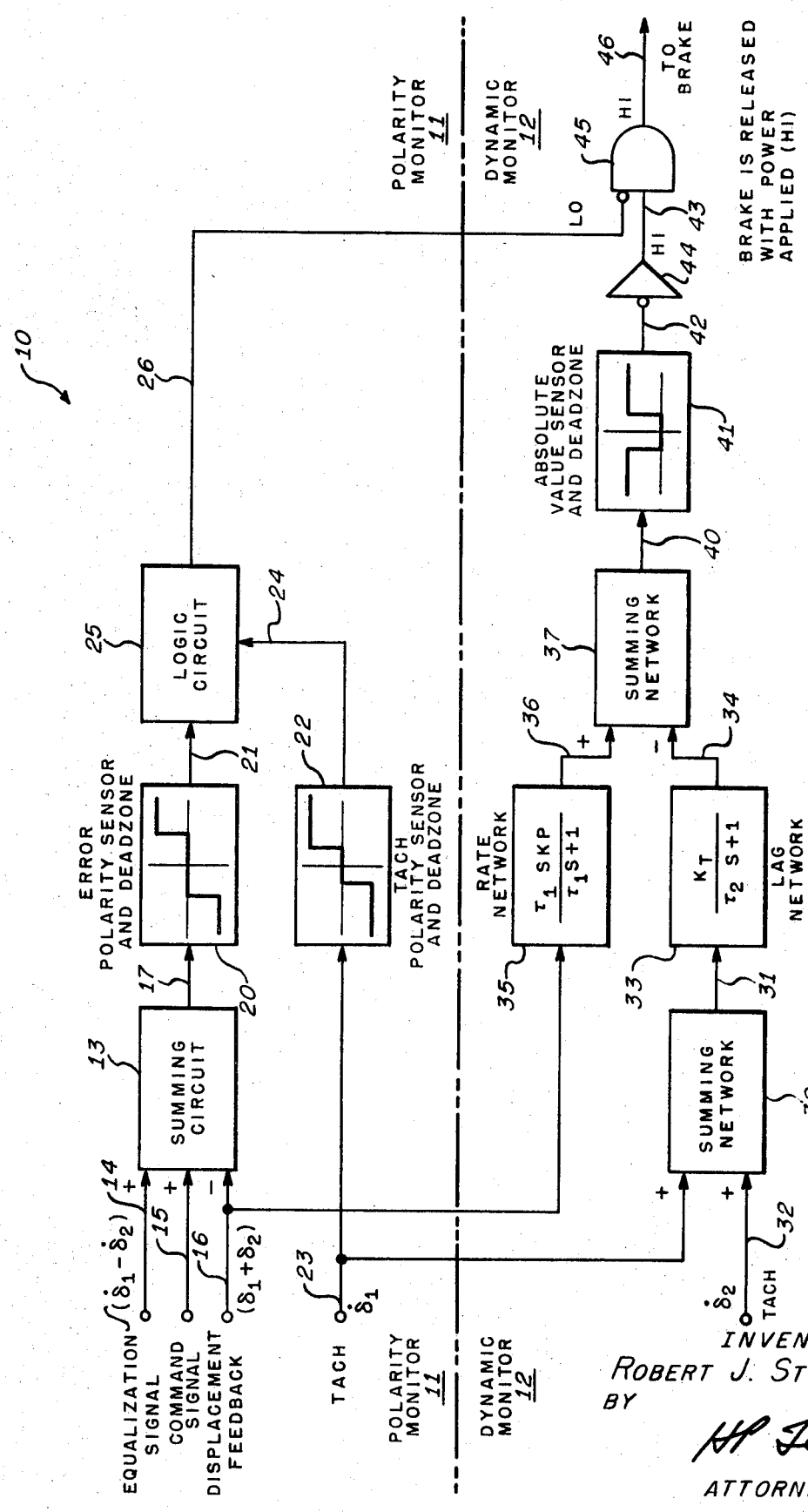
FIG. 1 is a block schematic diagram of a monitor in accordance with the principles of the present invention.

Referring to FIG. 1, a monitor 10 is illustrated comprising a polarity monitor 11 and a dynamic monitor 12. The polarity monitor 11 comprises a summing circuit 13 to which are applied as inputs an equalization signal, a servo command signal and a displacement feedback signals on leads 14, 15 and 16 respectively. The signals on the leads 14, 15 and 16 may be derived, with respect to FIG. 2 of said U.S. Pat. No. 3,504,248, from the integrator 55, the servo command input A, and the synchros 19 and 51, respectively. The summing circuit 13 subtracts the servo displacement feedback signal on the lead 16 from the sum of the command signal on the lead 15 and the equalization signal on the lead 14 to provide an error signal representative of the servo displacement error signal on a lead 17. The signal on the lead 17 is representative of the actual servo displacement error signal provided by servoamplifier 5 of FIG. 2 of said U.S. Pat. No. 3,504,248.

The signal on the lead 17 is applied as an input to an error polarity sensor and dead zone circuit 20. The circuit 20 provides a signal on a lead 21 whenever the error signal on the lead 17 exceeds a predetermined threshold. When the error signal exceeds the threshold and is of a positive polarity, the signal on the lead 21 is representative of the positive polarity. Similarly, when the error signal exceeds the threshold and is of a negative polarity, the signal on the lead 21 is representative of the negative polarity. The dead zone portion of the circuit 20 is included to compensate for differences in nulls of the system.

The polarity monitor 11 additionally includes a tachometer polarity sensor and dead zone circuit 22. The circuit 22 received as an input signal on a lead 23, the rate feed back signal from the tachometer generator 12 of FIG. 2 of said U.S. Pat. No. 3,504,248. The circuit 22 provides a signal on a lead 24 whenever the rate feedback signal on the lead 23 exceeds a predetermined threshold. The signal on the lead 24 is representative of the polarity of the rate feedback signal on the lead 23 in a manner similar to that described with respect to the circuit 20.

The signals on the leads 21 and 24 are applied as inputs to a logic circuit 25. The logic circuit 25 provides a first monitor signal on a lead 26 representative of servo malfunction. Ordinarily, the signal on the lead 26 is low representing a normally functioning servo. When a servo error signal exists on the lead 17 exceeding the dead zone of the circuit 20, the signal on the lead 26 becomes high if a tachometer signal does not exist on the lead 23 exceeding the dead zone of the circuit 22 and of a polarity so that the servo operates to reduce the error signal. A high signal on the lead 26 is representative of a malfunctioning servo. For example, when a positive servo error signal on the lead 17 exceeds the dead zone of the circuit 20, the tachometer signal on the lead 23 must exceed the dead zone of the circuit 22 and be of a negative polarity to maintain the signal on the lead 26 low. Similarly, when a negative servo error exceeds the dead zone of the circuit 20, the tachometer signal must exceed the dead zone of the circuit 22 and be of a positive polarity to maintain the signal on the lead 26 low.

It will be appreciated that the polarity monitor 11 permits any magnitude of servo displacement error to exist without indicating malfunction if the servo motor is turning in the proper direction to reduce the error.

From the foregoing it will be appreciated that the polarity monitor 11 detects failures in the servoamplifier and the servomotor as well as in the tachometers of the servo loop. Failures such as open windings and open circuits or frozen bearings are detectable by means of the polarity monitor 11.

Although the monitor 10 has been described in terms of a servo system having equalization, it is appreciated that the principles of the invention are equally applicable to servoes without equalization. When utilizing the invention in such a servo, the equalization input lead 14 would not be utilized. Similarly, if the equalization signal is summed with the command signal upstream of the servoamplifier input, only this summed signal would then be applied to the monitor. For purposes of operation of the monitor 10, the equalization signal may be considered as part of the total command input to the servo.

The dynamic monitor 12 of the monitoring apparatus 10 includes a summing circuit 30. The circuit 30 provides a signal on a lead 31 representative of the rate feedback signal of the Servosystem being monitored. The signal on the lead 31 is comprised of the sum of the tachometer signal on the lead 23 and the tachometer signal on the lead 32. As previously mentioned, the tachometer signal on the lead 23 is derived from the tachometer generator 12 of FIG. 2 of said U.S. Pat. No. 3,504,248. Similarly, the signal on the lead 32 is derived from the tachometer generator 20 of said patent.

The servo rate feedback signal on the lead 31 is applied as an input to a lag network 33. The lag network 33 has a transfer function of $(1)/(\tau S1)$ and provides the lagged rate feedback signal on a lead 34 for reasons to be explained.

The dynamic monitor 12 further includes a rate network 35 deriving its input from the servo displacement feedback signal on the lead 16. The rate network 35 differentiates the displacement feedback signal on the lead 16 in accordance with the transfer function $(\tau S)/(\tau S1)$ providing a signal on a lead 36 representative of the rate of change of the displacement feedback signal.

It will now be appreciated that the servo rate feedback signal on the lead 31 is lagged by the lag network 33 with a time-constant equal to that of the rate network 35 so as to produce a dynamic match between the signals on the leads 34 and 36 in accordance with the equation $$(\delta_1 + \delta_2)\left(\frac{K_P \tau_1 S}{\tau_1 S + 1}\right) - (\delta_1 + \delta_2)\left(\frac{S K_T}{\tau_2 S + 1}\right) = 0$$

The dynamic match will be proper when $\tau_1 = \tau_2$ and $K_P \tau_1 = K_T$.

The signals on the leads 34 and 36 are applied as inputs to a summing circuit 37. The circuit 37 subtracts the signal on the lead 34 from the signal on the lead 36 providing the difference therebetween on a lead 40.

The difference signal on the lead 40 is applied as an input to an absolute value sensor and dead zone circuit 41. The circuit 41 provides a high signal on a lead 42 whenever the absolute value of the signal on the lead 40 exceeds a predetermined threshold, a low signal otherwise being provided thereon. The dead zone of the circuit 41 is included to eliminate nuisance triggering of the dynamic monitor 12. The signal on the lead 42 provides a second monitor signal to a lead 43 via an inverter 44, the second monitor signal being representative of the operation of the servo being monitored. A low signal on the lead 43 is representative of a malfunctioning servo.

It will now be appreciated that the dynamic monitor 12 detects failures in the displacement feedback loop of the servosystem being monitored. In the dual channel servo of said U.S. Pat. No. 3,504,248 the displacement feedback signal represents the elevator jackscrew position and is actually the sum of both servo motor positions of the two channels as explained in said Patent. The rate of change of this displacement feedback signal is derived in the rate network 35 and then compared to the actual actuator rate in the circuits 37 and 41. The actual actuator rate is obtained in the dual servo system of said Patent by summing the tachometer signals of both channels in the summing circuit 30. If the comparison between the derived servo rate and the actual servo rate produces an error signal on the lead 40 that is in excess of the dead zone of the circuit 41, regardless of the polarity of the error, the second monitor signal on the lead 43 will become low indicating a malfunction in the servo displacement feedback path.

The first monitor signal on the lead 26 is applied to an inverting input of an output AND-gate 45. The second monitor signal on the lead 43 is applied as another input to the AND-gate 45. The AND-gate 45 provides a monitor output signal on a lead 46 which may be applied to the brake 36 of FIG. 2 of said U.S. Pat. No. 3,504,248 for the reasons explained therein. It will be appreciated that the signal on the lead 46 will be high in the absence of servo malfunctions. Should the signal on the lead 26 become high or the signal on the lead 43 become low because of a servo malfunction, the signal on the lead 46 will become low thereby applying the brake 36 in the manner described in said U.S. Pat. No. 3,504,248.

It will be appreciated that a delay device may be utilized to couple the signal on the lead 46 to the brake 36 to prevent nuisance triggering of the monitor due to transient conditions normally encountered in aircraft operation. Such transients may occur because of gust and turbulence loading of the aircraft.

Should a servo malfunction occur, it is often desirable to latch an indicator on so that the indicator remains on until the monitor is reset by the pilot. To accomplish this, conventional circuits, not shown, responsive to the signal on the lead 46 may be utilized to apply an error condition to the monitor input so as to maintain the failure indication until the circuits are reset.

Figure 3:
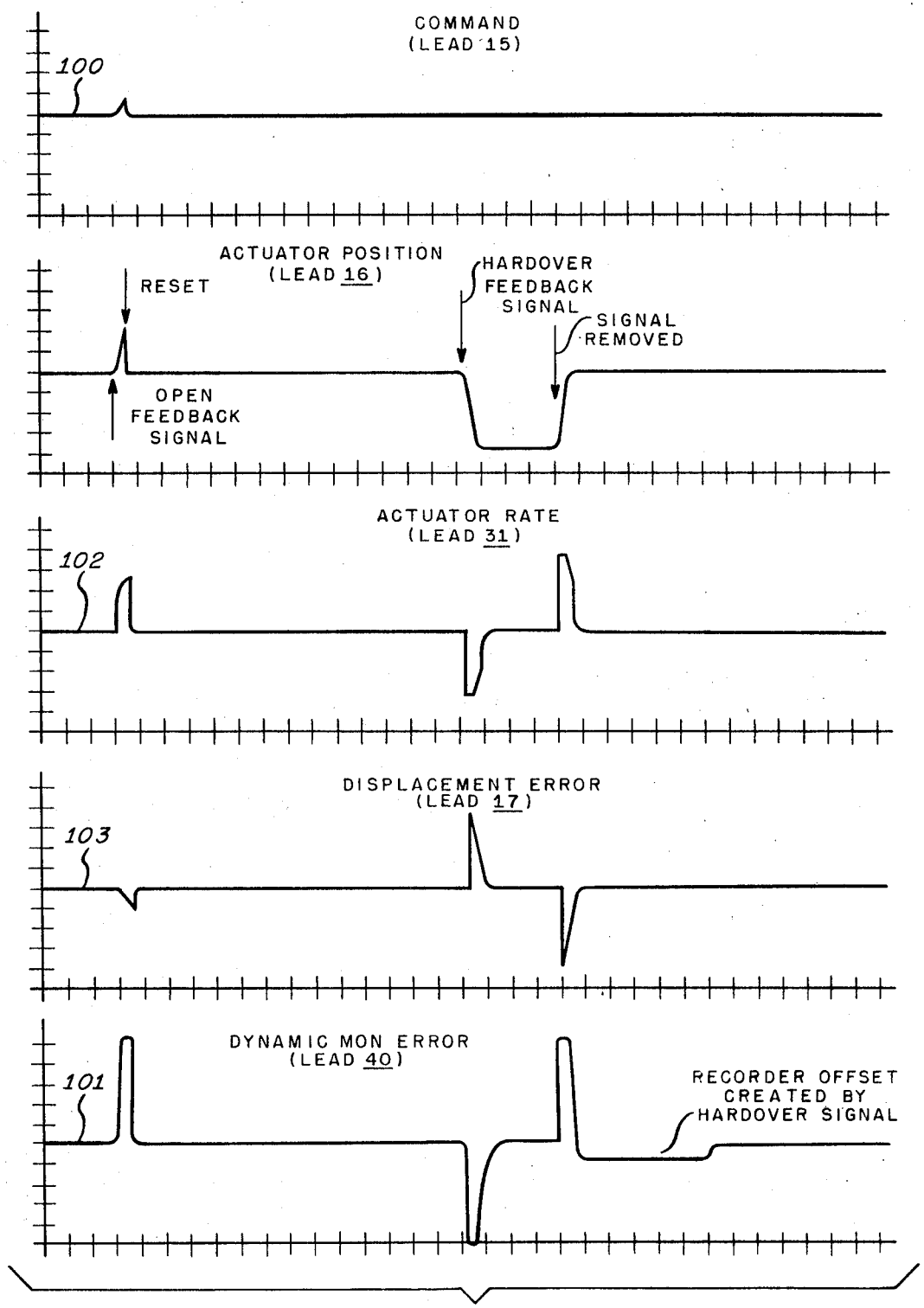
FIG. 3 is a waveform diagram useful in understanding the operation of the monitor of the present invention when monitoring a malfunctioning servo.

Referring to FIG. 2, waveforms are illustrated representing the operation of the monitor 10 when the servosystem being monitored is functioning properly. Curve 100 represents a variety of command input signals that may be encountered in aircraft flight modes. It is observed from curve 101 that a normally operating servosystem does not trigger the dynamic monitor 12. FIG. 3, however, illustrates tripping of the dynamic monitor 12 due to both an open displacement feedback failure and a hard-over displacement feedback failure. It should be noted from curves 102 and 103 of FIGS. 3 and 4 that the polarities of the rate feedback signal and the servo displacement error signal are such as not to trigger the polarity monitor 11.

It will be appreciated that although the preferred embodiment of the invention was described in terms of a dual channel servosystem, the principles of the invention are equally applicable to single channel servosystems.

It is further appreciated that from the waveforms 100 of FIG. 2 that the monitor of the present invention is insensitive to the type of the command input signal and will provide failure indications only for servo malfunctions.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A monitor for servoes responsive to command signals and having displacement and rate feedback signals comprising
   means responsive to said command signals and said displacement feedback signal for providing an error signal in accordance with the difference therebetween,
   means responsive to said error signal and said rate feedback signal for providing a first monitor signal in accordance with a comparison of the polarities thereof,
   means for deriving the rate of change of said displacement feedback signal thereby providing a derived displacement feedback signal functionally compatible with said rate feedback signal, and
   comparison means responsive to said derived displacement feedback signal and said rate feedback signal for providing a second monitor signal in accordance with a comparison therebetween,
   said first and second monitor signals being representative of malfunctions of said servo.

2. The monitor of claim 1 in which said rate of change deriving means comprises means having a transfer function in accordance with $(\tau S)/(\tau S+1)$.

3. The monitor of claim 2 further including means for lagging said rate feedback signal in accordance with the transfer function $(1)/(\tau S+1)$ thereby rendering said rate feedback signal dynamically compatible with said derived displacement feedback signal.

4. The monitor of claim 1 in which said comparison means includes
   means for providing a signal representative of the difference between said derived displacement signal and said rate feedback signal, and
   dead zone means responsive to said difference signal for providing said second monitor signal in accordance with the magnitude of said difference signal exceeding a predetermined threshold.

5. The monitor of claim 1 further including output means responsive to said first and second monitor signals for providing a monitor output signal in accordance with said first and second monitor signals representing malfunctions of said servo.

* * * * *